US006865313B2

(12) United States Patent
Mao et al.

(10) Patent No.: US 6,865,313 B2
(45) Date of Patent: Mar. 8, 2005

(54) BISTABLE LATCHING ACTUATOR FOR OPTICAL SWITCHING APPLICATIONS

(75) Inventors: Minyao Mao, Santa Rosa, CA (US); Martin Lim, San Mateo, CA (US); Robert Ostrom, Fremont, CA (US)

(73) Assignee: OpticNet, Inc., Hayward, CA (US)

( * ) Notice: Subject to any disclaimer, the term of this patent is extended or adjusted under 35 U.S.C. 154(b) by 0 days.

(21) Appl. No.: 10/435,511

(22) Filed: May 9, 2003

(65) Prior Publication Data

US 2004/0223204 A1 Nov. 11, 2004

(51) Int. Cl.⁷ ................................................. G02B 6/35
(52) U.S. Cl. .......................... 385/18; 385/16; 200/181
(58) Field of Search .............................. 385/16–19, 23; 200/181; 335/220; 359/214, 237, 245, 290, 298; 310/307, 309

(56) References Cited

U.S. PATENT DOCUMENTS

| | | | |
|---|---|---|---|
| 5,061,049 A | 10/1991 | Hornbeck | |
| 5,862,003 A * | 1/1999 | Saif et al. | ............... 359/871 |
| 6,025,951 A | 2/2000 | Swart et al. | |
| 6,072,617 A | 6/2000 | Henck | |
| 6,198,180 B1 | 3/2001 | Garcia | |
| 6,205,267 B1 | 3/2001 | Aksyuk et al. | |
| 6,229,640 B1 | 5/2001 | Zhang | |
| 6,239,685 B1 | 5/2001 | Albrecht et al. | |
| 6,253,001 B1 | 6/2001 | Hoen | |
| 6,303,885 B1 * | 10/2001 | Hichwa et al. | ............. 200/181 |
| 6,315,462 B1 * | 11/2001 | Anthamatten et al. | ........ 385/83 |
| 6,351,201 B1 | 2/2002 | Foster | |
| 6,360,033 B1 | 3/2002 | Lee et al. | |
| 6,388,359 B1 | 5/2002 | Duelli et al. | |
| 6,396,975 B1 | 5/2002 | Wood et al. | |
| 6,771,001 B2 * | 8/2004 | Mao et al. | .................. 310/309 |
| 2001/0051014 A1 | 12/2001 | Behin et al. | |
| 2002/0136485 A1 | 9/2002 | Reed et al. | |
| 2002/0172452 A1 * | 11/2002 | Zhang et al. | ................. 385/18 |

* cited by examiner

*Primary Examiner*—Frank G. Font
*Assistant Examiner*—Christopher M. Kalivoda
(74) *Attorney, Agent, or Firm*—Edward S. Wright

(57) ABSTRACT

Bistable latching actuator for use in optical fiber switching applications having a generally planar mechanism with an arm that carries a mirror for movement in a direction perpendicular to the plane of the mechanism, and a bistable mechanical latch for retaining the mirror in stable positions on opposite sides of the plane without contacting the arm. Movement between the two stable positions is initiated and damped with an electrostatic comb drive.

33 Claims, 14 Drawing Sheets

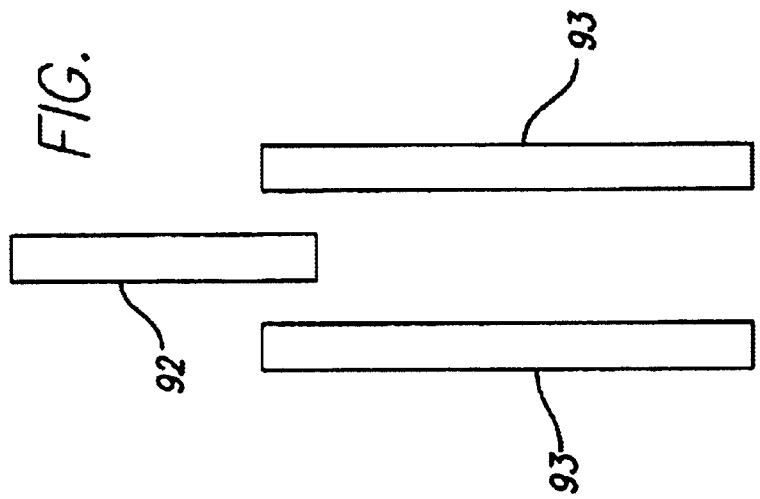
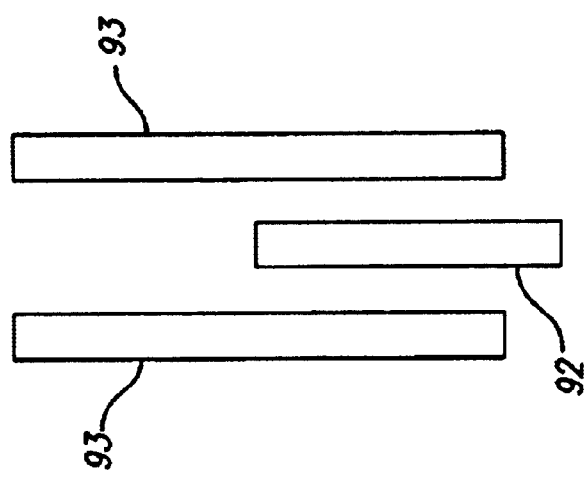
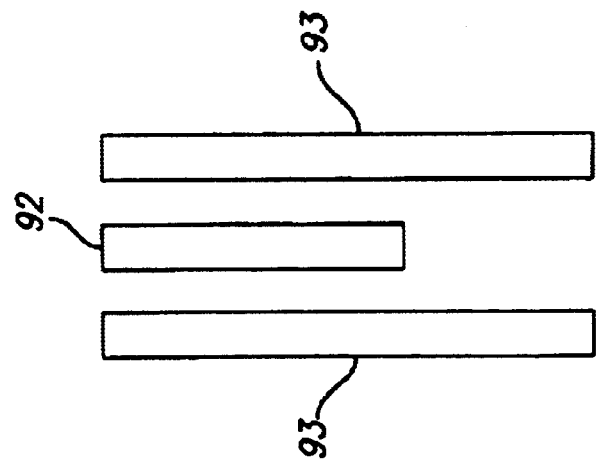

BISTABLE LATCHING ACTUATOR FOR OPTICAL SWITCHING APPLICATIONS

BACKGROUND OF THE INVENTION

1. Field of Invention

This invention pertains generally to micro electro mechanical system (MEMS) devices and, more particularly, to a MEMS actuator which is particularly suitable for use in fiber optical switching applications.

2. Related Art

Switches for routing fiber optical beams generally have digital micro mirrors which are moved into and out of optical paths to provide cross-connections between one or more inputs and one or more outputs. For small and medium cross-connect switches, e.g. up to about 16 inputs and 16 outputs, MEMS technology permits the replication of multiple mirrors in precisely aligned arrays. For smaller switches, e.g. 1×1 and 2×2 ports, it provides a low cost solution for an actuated mirror with precise alignment to integrated fiber optic channels.

It is generally desirable that such switches be mechanically latched so that the mirror will remain in position so the switch will retain its state when the power is off, and it is further desirable that the latching be non-contact for greater reliability and stiction-free operation. To minimize switching time, the mirror motion must be well controlled or damped to avoid optical signal oscillation, or ringing, before the mirror stabilizes.

OBJECTS AND SUMMARY OF THE INVENTION

It is, in general, an object of the invention to provide a new and improved bistable latching actuator which is particularly suitable for use in fiber optical switching applications.

Another object of the invention is to provide a bistable latching actuator of the above character which is substantially free of optical ringing.

Another object of the invention is to provide a bistable latching actuator of the above character in which switching time is minimized.

These and other objects are achieved in accordance with the invention by providing a bistable latching actuator for use in optical fiber switching applications having a generally planar mechanism with an arm that carries a mirror for movement in a direction perpendicular to the plane of the mechanism, and a bistable mechanical latch for retaining the mirror in stable positions on opposite sides of the plane without contacting the arm. Movement between the two stable positions is initiated and damped with an electrostatic comb drive. The displacement of the mirror in the two stable positions can be adjusted by the preloading of springs in the mechanism.

BRIEF DESCRIPTION OF THE DRAWINGS

FIGS. 15A–15C are cross-sectional operational views showing a sensor in the embodiment of FIG. 14 in different positions.

DETAILED DESCRIPTION

Figure 1:
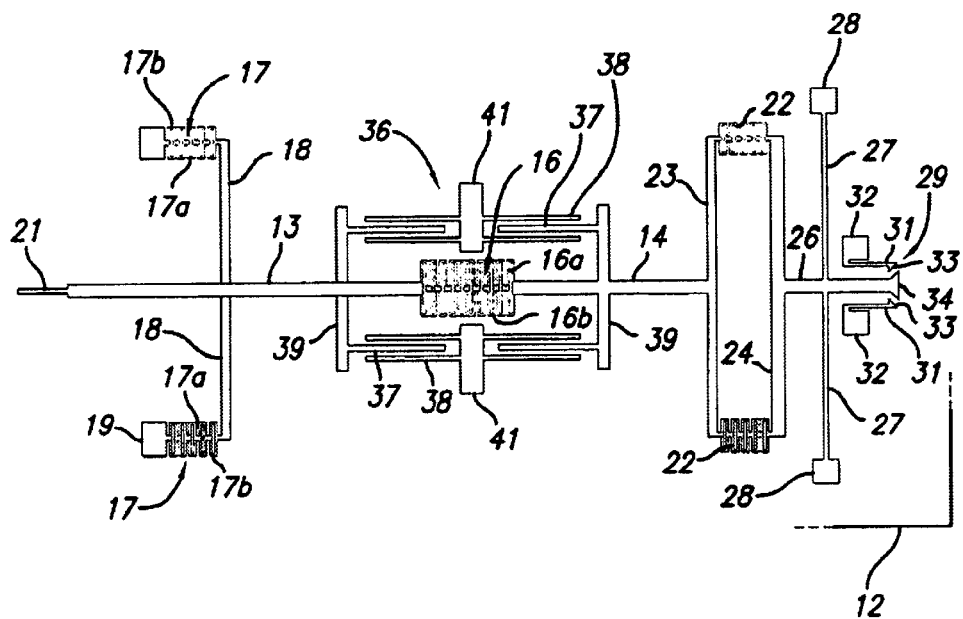
FIG. 1 is a top plan view of one embodiment of a bistable latching actuator according to the invention.

As illustrated in FIG. 1, the actuator is a MEMS device which is fabricated on a silicon substrate 12. A pair of longitudinally extending, axially aligned rocker arms 13, 14 are mounted end-to-end on the substrate, with the inner or confronting ends of the arms being flexibly coupled together by a spring 16 for movement in concert. This spring has a plurality of sections which are stacked in a longitudinal direction, with each section consisting of a pair of flexure plates 16a separated by spacers 16b at their side edges.

Rocker arm 13 is supported by springs 17 connected between cross arms 18 which extend laterally from the arm and posts 19 that are affixed to the substrate. These springs are similar to spring 16, but larger, and each has a plurality of sections which are stacked in a longitudinal direction, with each section consisting of a pair of flexure plates 17a separated by spacers 17b at their edges. In addition to storing energy when compressed, these springs permit arm 13 to rock in a direction perpendicular to the surface of the substrate.

A mirror 21 is attached to the outer end portion of rocker arm 13 for movement into and out of the path of an optical beam. The displacement or travel of the mirror is dependent upon the length of the cantilevered portion of the arm, i.e. the portion beyond the cross arms, relative to the portion between the cross arms and the inner end. This provides a mechanical advantage in which any desired mirror swing can be obtained simply by changing the length of the cantilevered portion. This makes it possible to adjust the mirror swing over a wide range for an actuator in which the inner arm length and displacement are fixed.

Rocker arm 14 is likewise supported by a pair of springs 22 which are connected to a cross arm 23 at the outer ends of the arm. These springs are similar to springs 17, and permit arm 14 to rock in a direction perpendicular to the surface of the substrate.

Rather than being connected directly to posts affixed to the substrate, however, the outer ends of springs 22 are connected to a preloader comprising a cross beam 24 at the inner end of a longitudinally extending stem 26. The stem is supported by one or more pairs of laterally extending leaf springs or flexures 27 for movement between advanced and retracted positions relative to the other springs. The outer ends of the flexures are affixed to the substrate by posts 28.

A latch 29 is provided for locking the preloader in the advanced position. This latch includes a pair of longitudinally extending resilient fingers 31 which are affixed at their inner ends to posts 32 and have catches 33 at their outer ends for engagement with an enlarged head 34 at the outer end of stem 26. The outer sides of the catches and the inner or under side of the enlarged head have inclined or tapered surfaces which provide a camming action that separates the fingers as the preloader is moved toward the advanced position.

Figure 2:
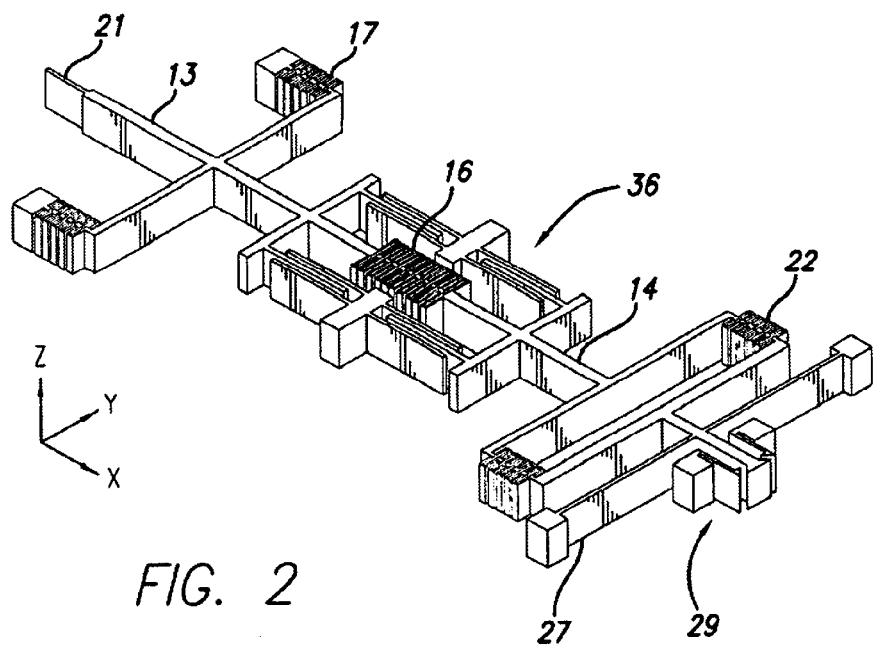
FIG. 2 is an isometric view of the embodiment of FIG. 1, with the actuator in the neutral position in which it is fabricated and the substrate removed for clarity of illustration.

The actuator is fabricated in a flat state, as shown in FIGS. 1 and 2, i.e. with the latch disengaged and all of the moving elements of the mechanism lying in an x, y plane parallel to the substrate.

Figure 3:
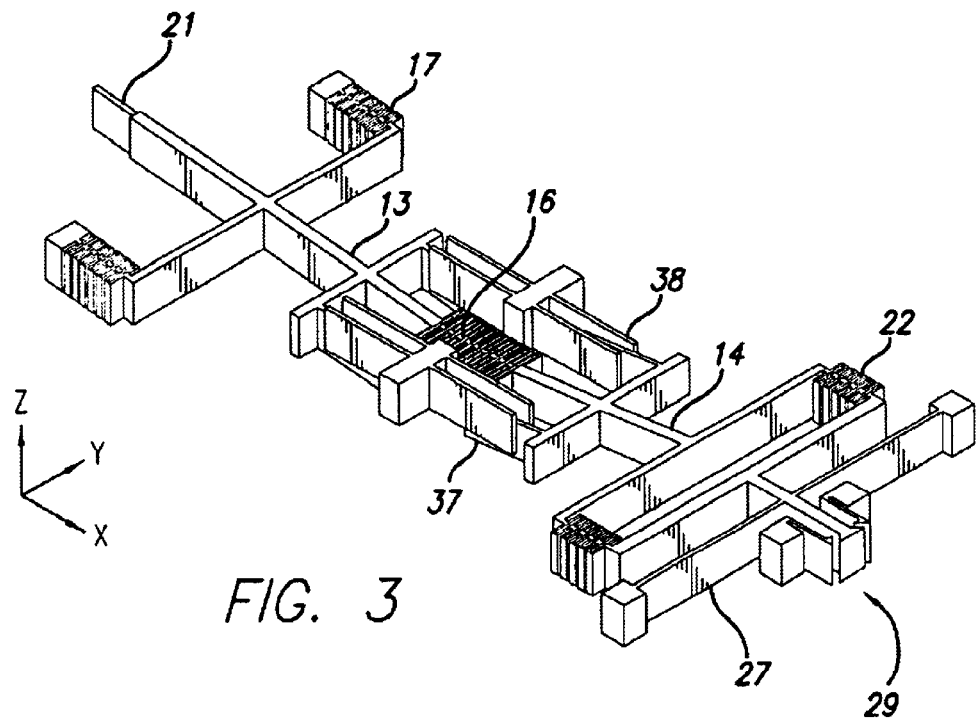
FIGS. 3 and 4 are views similar to FIG. 2, showing the actuator in its two stable, latched positions.
Figure 4:
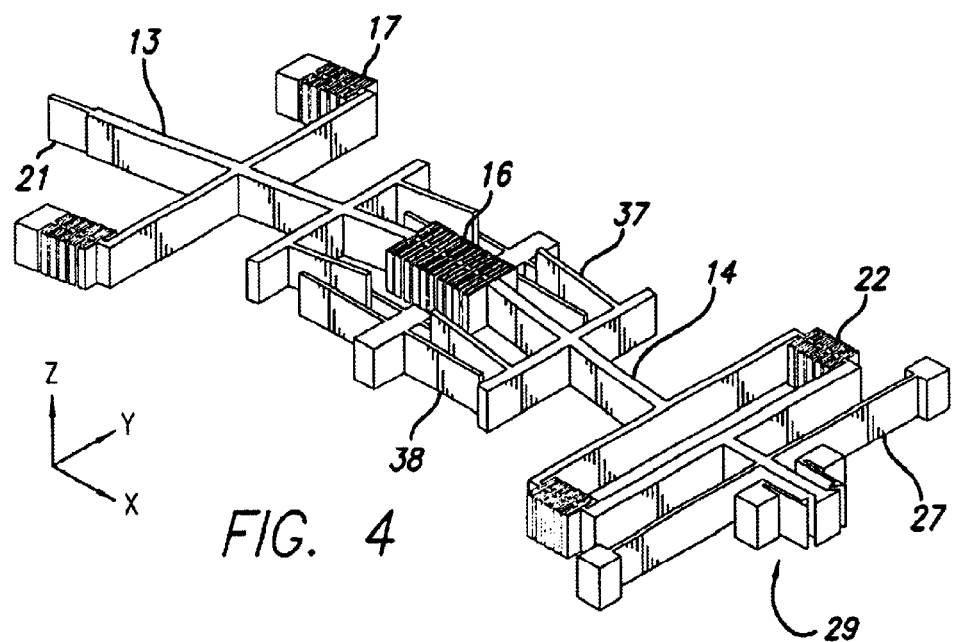

In use, springs 16, 17 and 22 are compressed and thereby preloaded by moving the preloader to its advanced position. The energy thus stored in the springs makes the mechanism unstable in its flat state and biases rocker arms 13, 14 for rotation about the midpoints of side springs 17, 22 to the two stable positions shown in FIGS. 3 and 4. In FIG. 3, the inner ends of the rocker arms are below the plane of fabrication, and the mirror 21 at the outer end of arm 13 is above it. In FIG. 4, the inner ends of the arms are above the plane, and the mirror is below it. The two stable positions are illustrated as being symmetrical with respect to the neutral or flat position of the mechanism, but in some instances residual stress and/or variations among the springs can cause the stable positions to be somewhat asymmetric.

As the preloader is moved toward the advanced position, the camming action of the inclined surface on stem head 34 spreads spring fingers 31 until the stem head has moved past catches 33, at which point the resilient fingers close down about the sides of the head, with the catches engaging the outer surface of the head to lock the mechanism in the preloaded condition.

Means is provided for toggling the mechanism selectively between its two stable states or latched positions. That means includes an electrostatic comb drive 36 having fingers 37 which are attached to the rocker arms and interleaved between stationary fingers 38 affixed to the substrate. The fingers extend longitudinally and are separated laterally, with fingers 37 being affixed to cross bars 39 on the rocker arms and fingers 38 being affixed to posts 41 on the substrate. With the mechanism in its neutral or flat position, movable fingers 37 are fully meshed with stationary fingers 38, and as the rocker arms rotate toward the stable positions, the movable fingers rotate away from and become less meshed with the stationary fingers. The mechanism can be toggled by applying a voltage pulse to the fingers, typically in the form of a single square wave.

Figure 5:
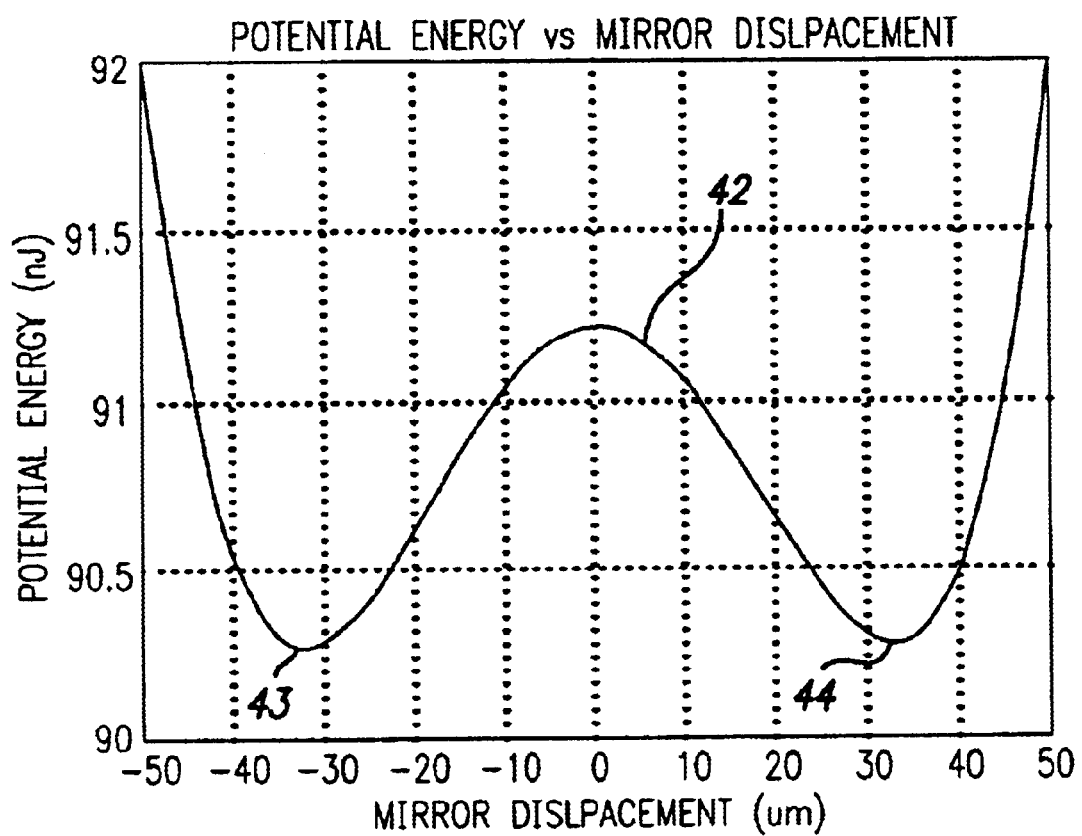
FIG. 5 is a graphical representation of the relationship between potential energy and mirror displacement in the embodiment of FIG. 1.

The relationship between the vertical (z-axis) displacement of the mirror and the potential energy stored in the springs in an exemplary embodiment of the actuator employed in a 2×2 fiber optic switch is shown in FIG. 5. From this curve, it can be seen that the potential energy reaches a maximum or peak 42 at a displacement of zero, i.e. when the rocker arms are in the neutral position and the springs are compressed by the preloader, and minimums 43, 44 when arms are in the two stable positions and no external force is applied. The two minimums are located symmetrically of the maximum, and the difference between the maximum and the minimums is the latching energy barrier, i.e. the amount of energy the system must gain in order to move from one stable position to the other.

In the example illustrated, the potential energy is 91.22 nanojoules when the mechanism in the neutral position and 90.27 nanojoules in the two latched positions. Hence, for this particular actuator, the latching energy barrier is 0.95 nanojoules, and the center of the mirror is approximately 32 micrometers above and below the plane of fabrication in the latched positions.

For a given actuator, the latching energy barrier and the displacement of the mirror are determined by the preload, with greater preloads providing larger energy barriers and greater displacements.

The electrostatic drive, in combination with the action of the springs, also provides damping of the mirror movement which is very beneficial in preventing mechanical and/or optical ringing as the mirror approaches its latched positions.

With the mechanism in one of the stable positions, a voltage applied between the movable and stationary fingers of the comb drive produces electrostatic forces which tend to draw the movable fingers in toward the stationary fingers. As the moving fingers approach the middle position, the electrostatic forces decrease to zero, but the fingers continue to move because of their kinetic energy. Once the fingers pass the middle position, the electrostatic forces change direction and provide a retarding force which takes energy out of the system.

Figure 6:
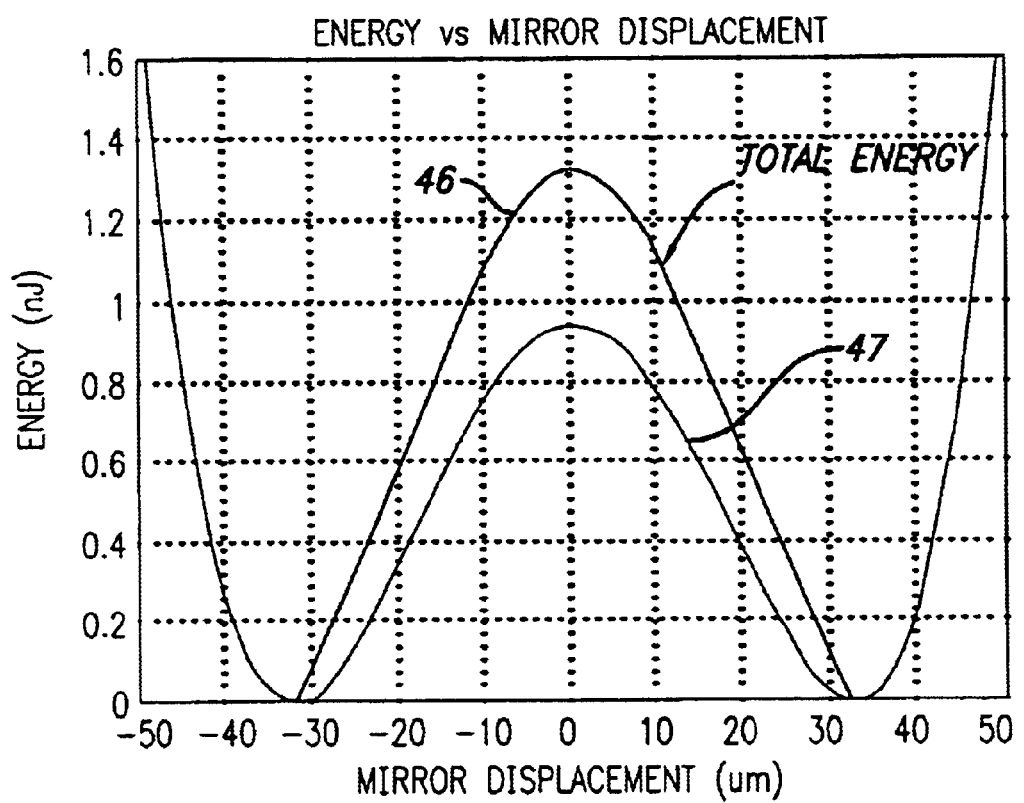
FIG. 6 is a graphical representation of the relationship between total energy, potential energy, and mirror displacement in the embodiment of FIG. 1.

The energy which the actuator gains from the electrostatic field created by the switching pulse is illustrated in FIG. 6, with the total energy gain being represented by curve 46, the potential energy of the springs being represented by curve 47, and the minimum value of the potential energy being used as a zero reference for simplicity. At any mirror displacement, the difference between the total energy and the potential energy is the kinetic energy which determines the speed of the mirror when it reaches that position. At the points where the two curves intercept the kinetic energy and mirror speed are zero, and if those points coincide with the two stable positions, the mirror will remain in those positions without mechanical oscillation when the drive voltage is removed.

Because of the symmetry of the mechanical system and the electrostatic driver, the amount of energy taken out during deceleration is exactly the same as that put in during acceleration. Therefore, in a ideal system with no other energy dissipating source such as air damping, the total energy curve will intercept the potential energy curve precisely at the two stable positions, and the mirror will move from one of those positions to the other with no mechanical ringing or oscillation.

In a system in which air damping occurs, the intercept point corresponding to the position toward which the mirror is moving will be slightly before the stable position, and the mirror may stop a bit short and oscillate before reaching the final latching position. However, even if that does happen, the switching will still be free of optical ringing as long as the mirror is sized properly for the beam.

Figure 7:
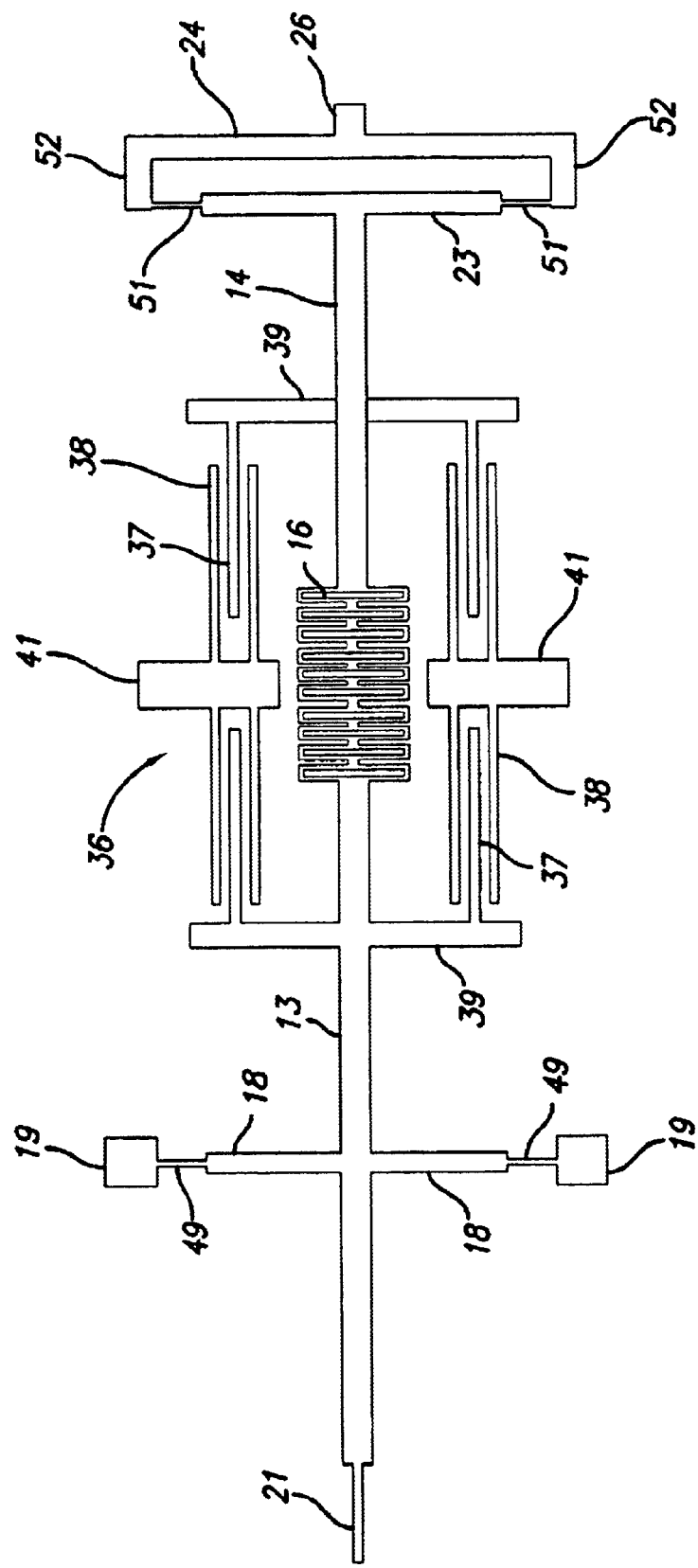
FIGS. 7 and 8 are fragmentary top plan views of additional embodiments of a bistable latching actuator according to the invention.

The embodiment of FIG. 7 is generally similar to the embodiment of FIG. 1, and like reference numerals designate corresponding elements in the two. In this embodiment, however, rocker arm 13 is supported by torsion bars 49 which extend in a lateral direction between the outer ends of cross arms 18 and posts 19. Rocker arm 14 is likewise supported by torsion bars 51 which extend in laterally between the outer ends of cross arm 23 and longitudinally extending arms 52 at the outer ends of cross beam 24.

With the straight torsion springs, the latching positions are less sensitive to variations in the thickness of the overall device than they are with the springs utilized in the embodiment of FIG. 1. Torsion springs 49, 51 are generally much stronger than center spring 16 both for rotation and for compression, and more energy is stored in the center spring when the actuator is in the neutral or flat position and the preload is applied.

Since they are deflected relatively little, the torsion springs serve more as pivots, and for a given latching energy barrier, an actuator with such springs can generally have a greater preload distance and higher lateral stability than one with springs of the type shown in FIG. 1. That lateral stability permits the use of smaller gaps between the fingers of the drive combs and thereby improves their efficiency.

Figure 8:
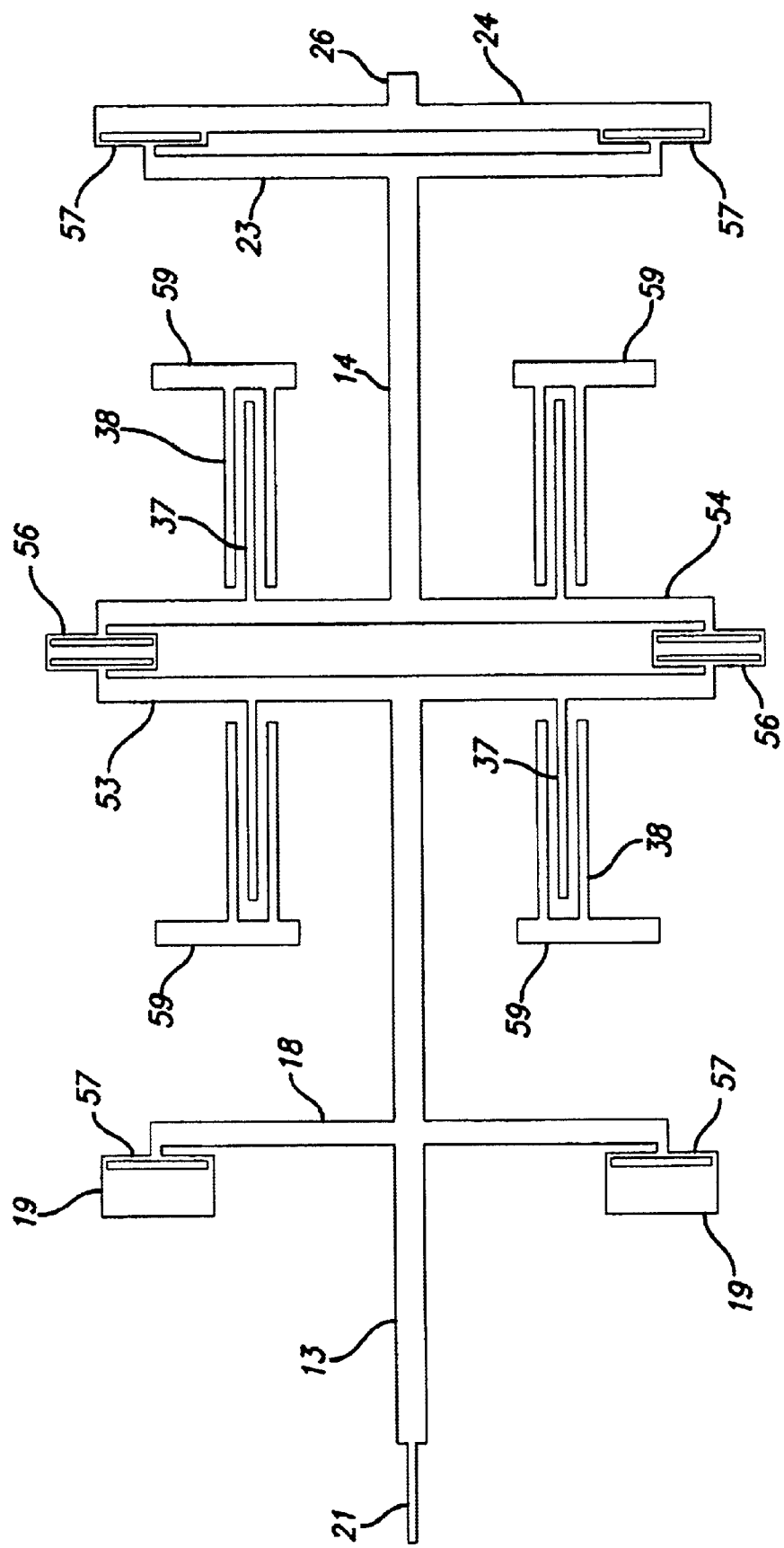

The embodiment of FIG. 8 is also generally similar to the embodiment of FIG. 1, and corresponding elements are once again designated by like reference numerals. In this embodiment, however, rocker arms 13, 14 have cross bars 53, 54 at their inner ends, and are connected together by back-to-back pairs of U-shaped springs 56 at the outer ends of the cross bars. The two rocker arms are also supported by U-shaped springs 57 which are identical to springs 56. Springs are connected between the outer ends of cross arms 18 and posts 19, and between the outer ends of cross arms 23 and cross bar 24. Each of the U-shaped springs has a relatively long central section to which the load is applied and a pair of relatively short legs at opposite ends of the central section.

In this embodiment, the inner ends of movable fingers 37 are affixed to cross bars 53, 54, and the outer ends of stationary fingers 38 are affixed to posts 59 on the substrate. As in the other embodiments, with the mechanism in its neutral or flat position, movable fingers 37 are fully meshed with stationary fingers 38

Due to the symmetry of the springs, each of them functions as a latching element which contributes equally to the overall performance of the actuator. With proper design of the springs, the critical dimension sensitivity of the rotation and compression spring constants can be well balanced, with greater tolerance of the latching performance to variations in the critical dimension. Also, having two center springs which are spaced laterally from the central axis and connected to the rocker arms by rigid cross arms substantially improves the lateral stability of the device.

Figure 9:
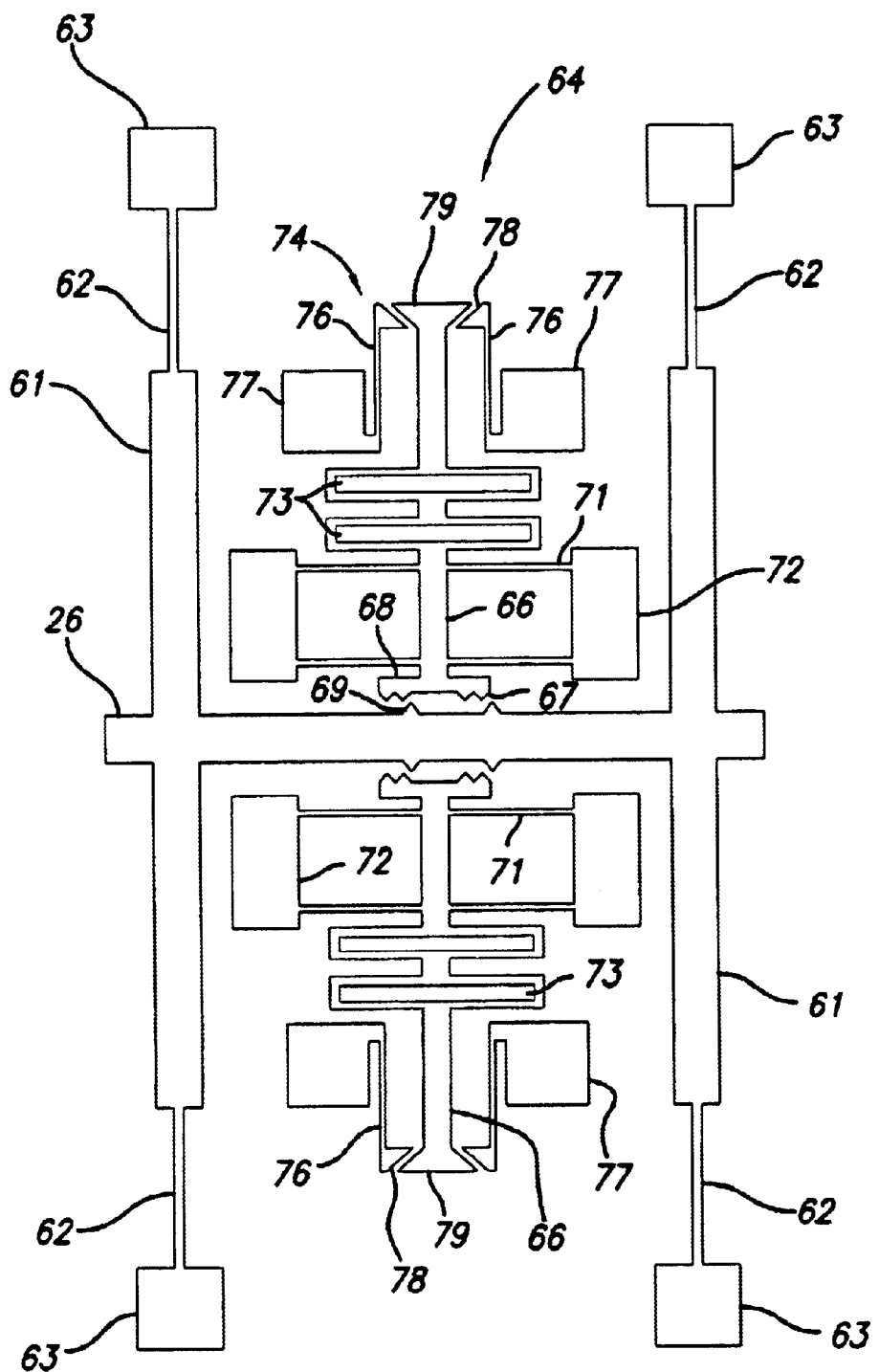
FIG. 9 is a fragmentary top plan view of another embodiment of a preloading mechanism for use in a latching actuator according to the invention.

FIG. 9 illustrates an another embodiment of a preloader which can be used with any of the embodiments of the actuator disclosed herein. In this embodiment, one or more cross arms 61 extend laterally from stem 26, and the stem is supported by leaf springs 62 which extend laterally between the outer ends of the cross arms and posts 63 affixed to the substrate. These springs permit the stem to move in an axial or longitudinal direction and also serve as guides which prevent motion in other directions.

The preloader is held in an advanced or preloading position by a locking mechanism 64 which has a pair of laterally extending lock stems 66 with teeth 67 on flanges 68 at their inner ends for engagement with corresponding teeth 69 on the sides of main stem 26. The lock stems are supported by leaf springs 71 which are affixed to posts 72 and serve as guides for them. The lock stems are formed in two sections which are connected together by compression springs 73 that urge the inner sections toward the main stem.

The lock stems are held in their advanced or locking positions by latches 74 which are similar to latch 29. Each of these latches includes a pair of resilient fingers 76 which are affixed at their inner ends to posts 77 and have catches 78 at their outer ends for engagement with enlarged heads 79 at the outer ends of stems 26.

Figure 10:
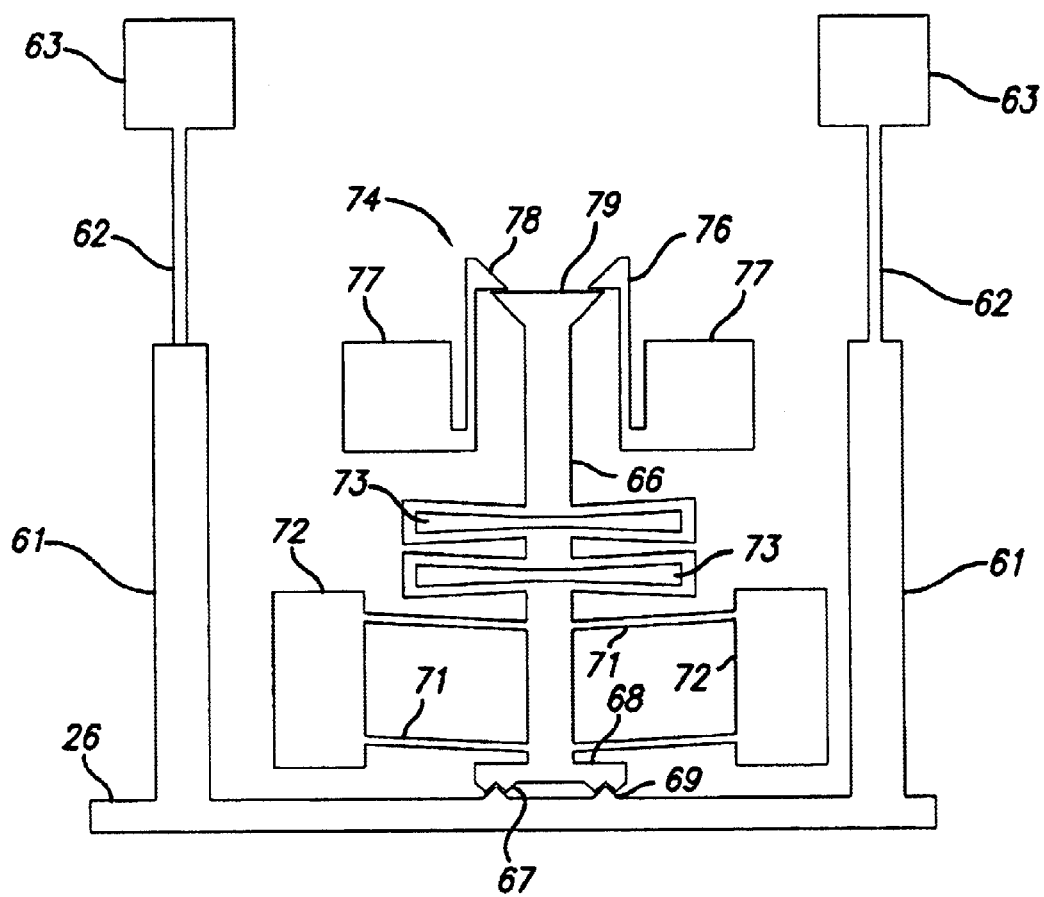
FIG. 10 is an operational view of the embodiment of FIG. 9, with the stem in its advanced or preloading position and one of the stem locks in locking engagement with the stem.

In use, the main stem 26 of the preloader is pushed to its advanced position, and the two lock stems are pushed toward the main stem and latched in a locking position by latches 74, with compression springs 73 urging teeth 67 into locking engagement with teeth 69 to hold the main stem in the advanced position, as illustrated in FIG. 10. In view of the triangular shape of the teeth, the preload distance can be precisely achieved notwithstanding variation in critical dimension.

Figure 11:
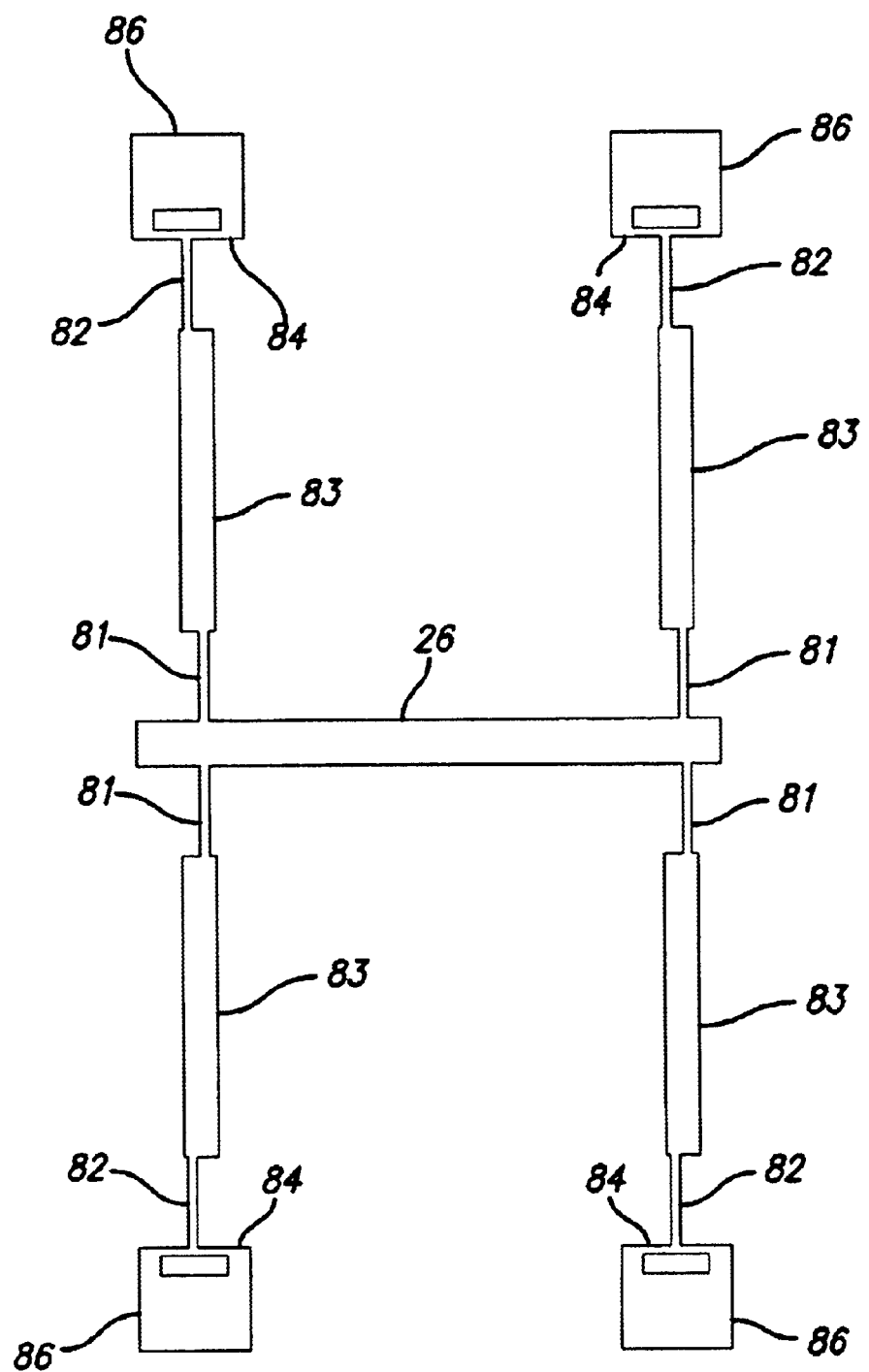
FIGS. 11–13 are fragmentary top plan views of additional embodiments of preloading mechanisms for use in a latching actuator according to the invention.

The embodiment of the preloader shown in FIG. 11 is bistable and does not require a mechanical latch to hold it in its advanced or preloading position. In this embodiment, stem 26 is supported by leaf springs or flexures 81, 82 at the inner and outer ends of laterally extending arms 83.

Leaf spring 81, 82 are offset in the direction of the preload, with inner springs 81 being connected toward the right sides of the arms, as viewed in FIG. 11, and outer springs 82 being connected toward the left sides. The two springs in each pair thus lie in planes which are offset longitudinally of each other relative to stem 26. The outer ends of springs 82 are connected to deformable springs 84 which are fixed at their ends to posts 86 affixed to the substrate.

With the leaf springs or flexures offset in this manner, they provide a force which tends to offset or cancel the force produced by the springs in the actuator as the preloader starts to move through its central or neutral position. The two forces are balanced at the desired preload position, and the preloader will remain in that position without a latch or mechanical contact lock.

This embodiment is easy to preload, although without a mechanical latch, it is more susceptible to external disturbances such as vibration and shock. However, by making the latching force large enough, the desired preload can be maintained even if such disturbances do occur.

Figure 12:
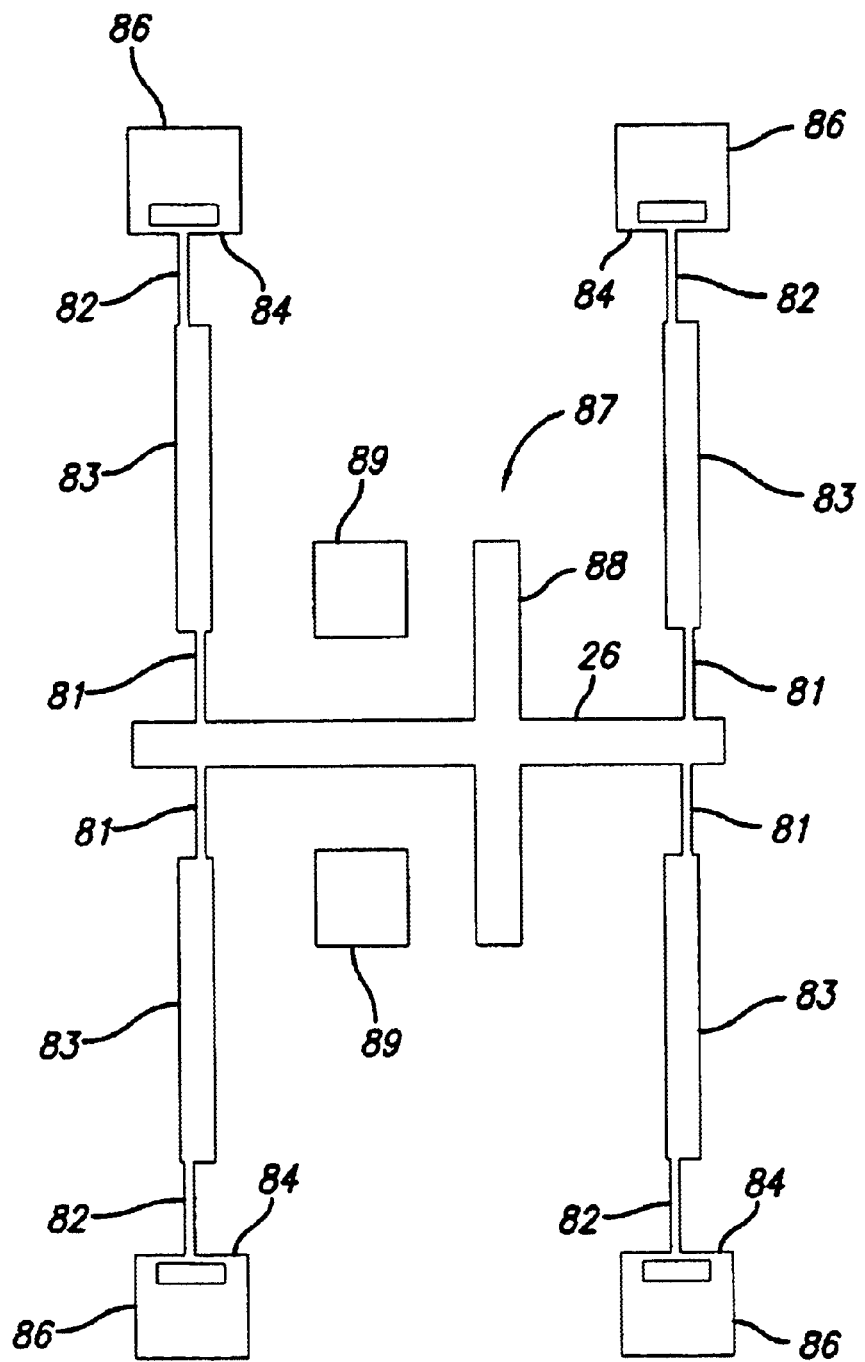

The embodiment of FIG. 12 is similar to the embodiment of FIG. 11, with the addition of a mechanical stop 87 which determines the amount of preload. As illustrated, the stop consists of a crossbar 88 on stem 26 and a pair of posts 89 which are affixed to the substrate and engaged by the crossbar when the preloader is set. With the stop, the preload latching force can be increased to overcome disturbances such as vibration and shock without changing the preload applied to the actuator springs.

Figure 13:
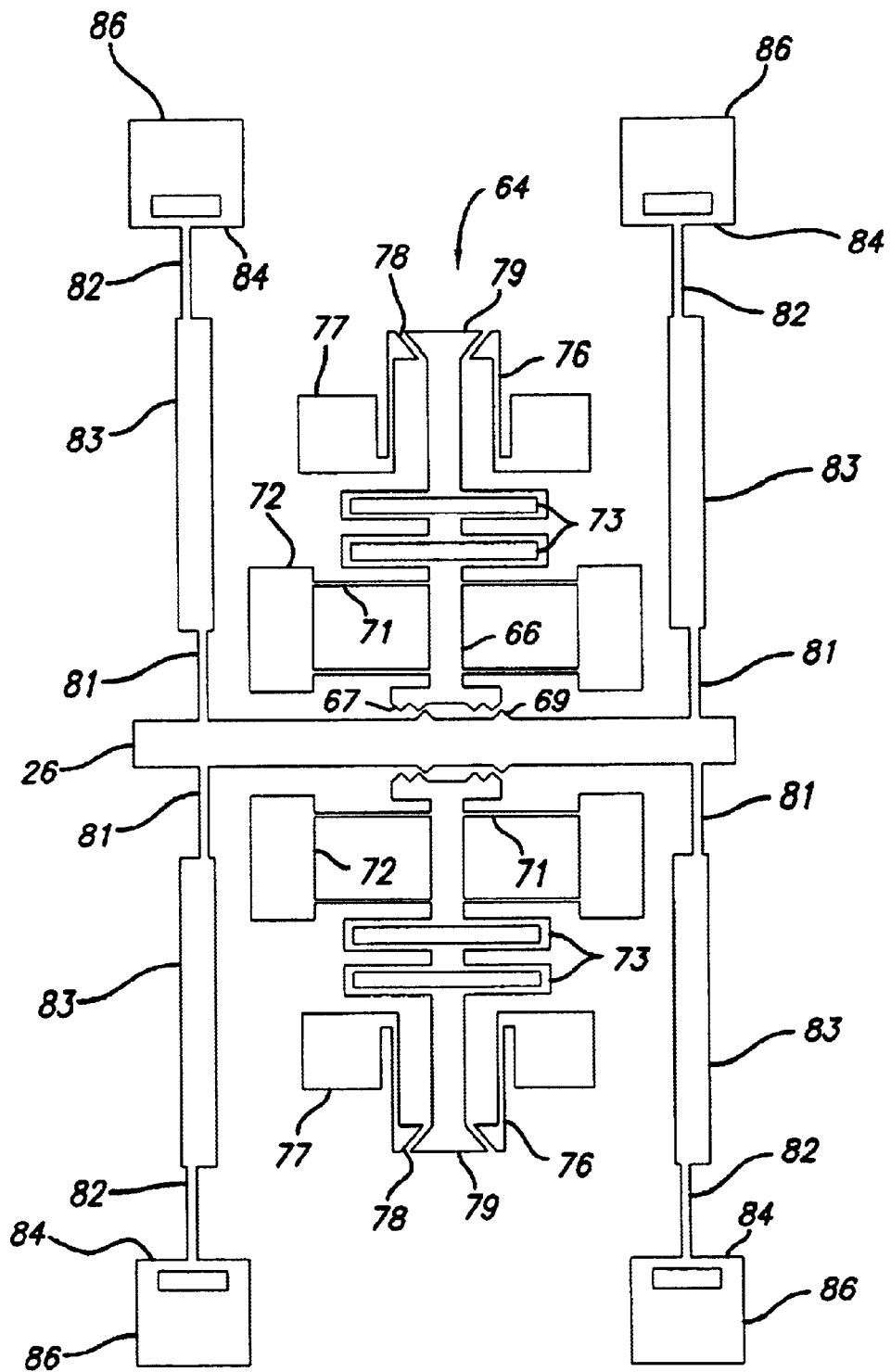

In the embodiment of FIG. 13, the bistable springs 81–84 of FIG. 11 are combined with the locking mechanism 64 of FIG. 9 to provide a preloader in which the amount of preloading is independent of critical dimension variation and can be controlled even more precisely. With the bistable springs also holding the preloader stem 26 in the advanced or preloading position, the force applied to lock teeth 67, 69 by springs 73 does not have to be as great as it does with conventional leaf springs, and that also permits more precise control over the amount of preloading.

Figure 14:
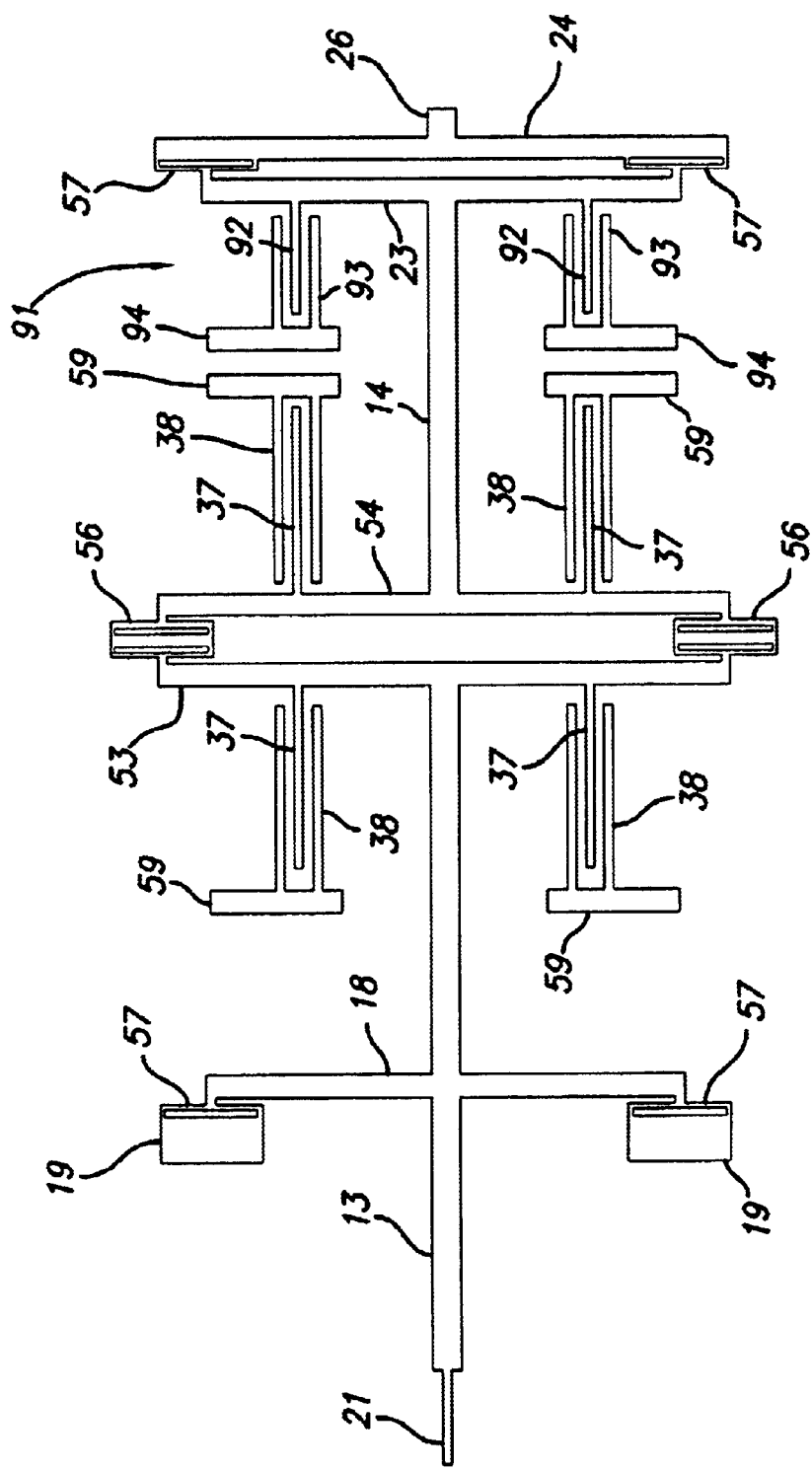
FIG. 14 is a fragmentary top plan view of another embodiment of a bistable latching actuator according to the invention.

The embodiment of FIG. 14 is similar to the embodiment of FIG. 8, with the addition of a sensor 91 for monitoring the position of the mirror and, hence, the state of the switch. The sensor comprises two sets of capacitively coupled comb fingers each having a moving finger 92 positioned between two stationary fingers 93. The moving fingers are affixed to cross arms 23 at the outer end of rocker arm 14, and the stationary fingers are attached to posts 94 which are affixed to the substrate.

As best seen in FIGS. 15A–15C, moving fingers 92 are shorter in height than stationary fingers 93 and are positioned asymmetrically of the stationary fingers when the actuator is in the fabricated or neutral position. Thus, as shown in FIG. 15A, the upper edge of moving finger 92 is flush with the upper edges of stationary fingers 93 in the neutral position.

When the actuator is in the state in which the mirror is positioned above the neutral plane or the plane of fabrication, a relatively small portion of moving finger 92 is below stationary fingers 93, as shown in FIG. 15B.

When the actuator is in the state with the mirror below the neutral plane or the plane of fabrication, a relatively large portion of moving finger 92 is above stationary fingers 93, as shown in FIG. 15C.

Figure 16:
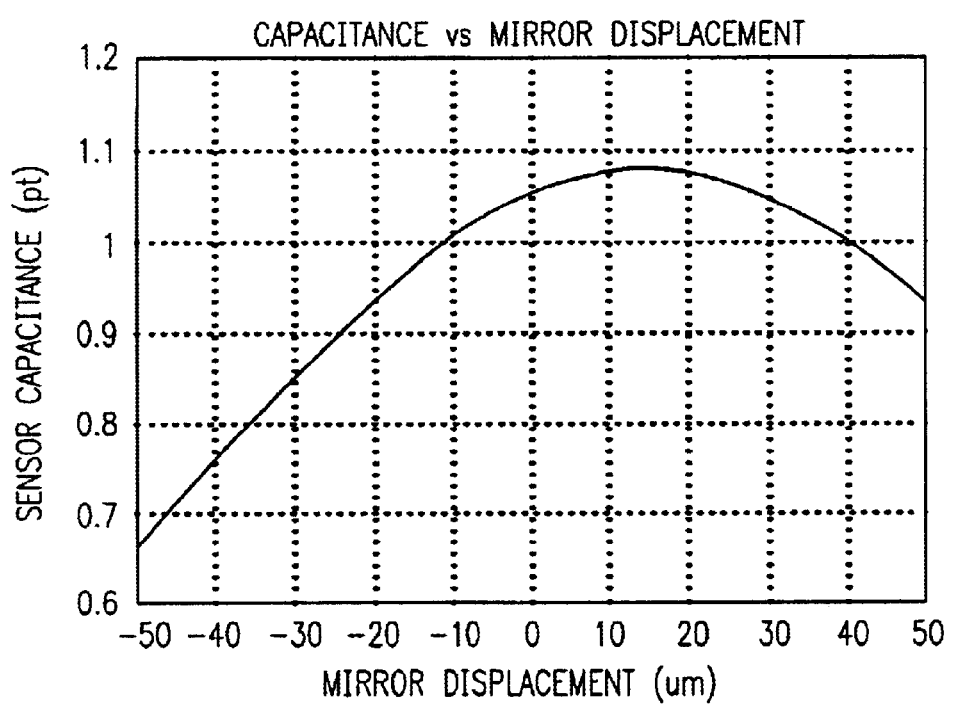
FIG. 16 is a graphical representation of the relationship between sensor capacitance and mirror position in the embodiment of FIG. 14.

The relationship between sensor capacitance and mirror displacement for an exemplary embodiment is shown graphically in FIG. 16. In this example, the mirror has a displacement of the mirror is 32.5 um in the up state and −32.5 um in the down state. This corresponds to a sensor comb capacitance of 1.04 pf in the up state and 0.83 pf in the down state.

The invention has a number of important features and advantages. It provides a unique and reliable non-contact latching system having two stable states which can be precisely symmetrical. The mounting of the mirror on the cantilevered portion of the rocker arm provides mechanical amplification and, therefore, a wide range of mirror displacement can be achieved. By adjusting the length of the cantilevered portion, the range of mirror movement can be adjusted without changing anything else in the actuator, and it can be made very large, if desired.

With its wide range of mirror travel and out-of-plane mirror movement, the actuator is ideally suited for applications ranging from small fabric switches, e.g. 1×2 and 2×2, to medium fabric switches, e.g. 8×8 and 16×16.

The preloading equalizes the two latched states, which means that any pulse that can drive the mirror from one state to the other can also be used to drive it in the opposite direction. That yields the largest actuation window of voltage and pulse width in which each point can be used to change the mirror state.

The preloading also makes the energy barrier of the latching system much smaller than the total energy stored in the mechanical system at is middle or neutral position, with the latching energy barrier typically being only a few percent or less of the total energy. That permits the driving voltage to be lower, the springs to be bigger, and the motion to be greater. This is a significant improvement over prior art systems having in-plane movement, no preloading, and the fabricated state being used as one of the latching positions. There, the latching energy barriers equals the total energy stored in the system in the middle state, and that results in a higher driving voltage, larger size, smaller springs, and a shorter mirror driving distance.

With the vertical comb drive fingers being fabricated in the same plane as the rest of the mechanism, the need for two layers and precision aligned bonding is avoided, and the process is greatly simplified.

The desired displacement of the mirror is precisely maintained by the preload system which locks the preloader in position and maintains a constant preloading of the system. Although this latch does involve mechanical contact with the preloader stem, there is no wear or stiction since it is permanently engaged and does not move during the switching of the actuator between the stable states.

It is apparent from the foregoing that a new and improved bistable latching actuator has been provided. While only certain presently preferred embodiments have been described in detail, as will be apparent to those familiar with the art, certain changes and modifications can be made without departing from the scope of the invention as defined by the following claims.

What is claimed is:

1. A bistable latching actuator for use in optical fiber switching applications, comprising: a pair of rocker arms disposed end-to-end for movement into and out of a plane, a flexible coupling between confronting ends of the arms, a mirror mounted on one of the arms, means yieldably urging the arms toward each other with a force that causes the arms to rock to and remain in two stable latching positions with the confronting ends on opposite sides of the plane, and means for selectively moving the arms between the two stable latching positions.

2. The actuator of claim 1 wherein the flexible coupling comprises a spring.

3. The actuator of claim 1 wherein the means for moving the arms between the two positions comprises an electrostatic comb drive for applying a force to the arms in a direction generally perpendicular to the plane.

4. The actuator of claim 1 including a sensor for monitoring the positions of the arms.

5. The actuator of claim 4 wherein the sensor comprises a comb sensor having a plurality of fingers coupled to one of the arms and forming a capacitor which varies in capacitance in accordance with the position of the arms.

6. A bistable latching actuator for use in optical fiber switching applications, comprising: a pair of rocker arms disposed end-to-end, laterally extending cross arms affixed to the rocker arms, longitudinally extending mounting springs connected to the cross arms and supporting the rocker arms for movement relative to a plane, a coupling spring extending longitudinally between confronting ends of the rocker arms and constraining the confronting ends for movement in concert between opposite sides of the plane, a mirror carried by one of the rocker arms, means for compressing the springs to preload the springs and thereby bias the confronting ends of the rocker arms toward stable latching positions on opposite sides of the plane, and means for selectively switching the arms between the stable latching positions.

7. The actuator of claim 6 wherein the mirror is carried by a portion of the rocker arm which extends beyond the cross arm in cantilevered fashion.

8. The actuator of claim 6 wherein the means for compressing the springs includes a preloader which bears against the mounting springs supporting one of the rocker arms and is movable between longitudinally advanced and retracted positions.

9. The actuator of claim 8 wherein the preloader comprises a longitudinally extending stem, a pair of laterally extending flexures supporting the stem for movement between the advanced and retracted positions, and a cross beam which is affixed to the stem and bears against the mounting springs.

10. The actuator of claim 8 including a latch for holding the preloader in the advanced position.

11. The actuator of claim 6 wherein the means for switching the arms between the two positions comprises an electrostatic comb drive for applying a force to the arms in a direction generally perpendicular to the plane.

12. A bistable latching actuator for use in optical fiber switching applications, comprising: a substrate, first and second rocker arms disposed end-to-end and generally parallel to a major surface of the substrate, a mirror carried by the first rocker arm for movement in a direction generally perpendicular to the surface of the substrate, cross arms extending laterally from the rocker arms and parallel to the surface of the substrate, a first set of mounting springs extending between the cross arms on the first rocker arm and anchors affixed to the substrate, a longitudinally extending stem supported by a pair of laterally extending flexures for movement between advanced and retracted positions, a cross beam affixed to the stem, a second set of mounting springs disposed between the cross beam and the cross arm on the second rocker arm, a spring which couples the confronting ends of the rocker arms together for movement in concert, a latch engagable with the stem for holding the stem in its advanced position with the springs compressed and biasing the confronting ends of the rocker arms toward stable latching positions on opposite sides of a plane parallel to the surface of the substrate, and an electrostatic comb drive having interleaved fingers affixed to the rocker arms and to the substrate for initiating movement of the rocker arms between the stable latching positions.

13. A bistable latching actuator for use in optical fiber switching applications, comprising a generally planar mechanism having an arm which carries a mirror for movement in a direction perpendicular to the plane of the mechanism, and a bistable mechanical latch for retaining the mirror in stable positions on opposite sides of the plane without contacting the arm.

14. The actuator of claim 13 wherein the stable positions are disposed symmetrically of the plane.

15. The actuator of claim 13 wherein the arm is mounted for pivotal movement into and out of the plane, and the latch includes a spring coupled to the arm in such manner that the spring is compressed when the arm is in the plane and relaxed when the mirror is in the stable positions.

16. The actuator of claim 13 including an electrostatic comb drive for applying a force to the arm to initiate and damp movement between the stable positions.

17. A bistable latching actuator for use in optical fiber switching applications, comprising a generally planar mechanism having an arm which carries a mirror for movement between two stable positions on opposite sides of the plane of the mechanism, and an electrostatic comb drive for applying a force to the arm to initiate and damp movement between the stable positions.

18. A bistable latching actuator for use in optical fiber switching applications, comprising: a pair of longitudinally extending rocker arms disposed end-to-end, mounting springs supporting the rocker arms for rocking movement relative to a plane, a coupling spring interconnecting confronting ends of the rocker arms and constraining the confronting ends for movement in concert between opposite sides of the plane, a mirror carried by one of the rocker arms, and a preloader for exerting a preloading force upon the springs so that the springs bias the confronting ends of the rocker arms toward stable latching positions on opposite sides of the plane.

19. The actuator of claim 18 wherein the mounting springs extend in a direction generally parallel to the rocker arms and are compressed by the preloading force.

20. The actuator of claim 18 wherein the mounting springs are leaf springs which extend in a direction generally perpendicular to the rocker arms.

21. The actuator of claim 18 wherein the mounting springs are generally U-shaped and have relatively long central sections which extend in a direction generally perpendicular to the rocker arms.

22. The actuator of claim 18 wherein the confronting ends of the rocker arms are connected together by a back-to-back pair of U-shaped springs.

23. The actuator of claim 18 wherein the confronting ends of the rocker arms are connected together by springs spaced laterally apart on opposite sides of the rocker arms and positioned between laterally extending cross arms at the confronting ends of the rocker arms.

24. The actuator of claim 18 wherein the preloader comprises a longitudinally extending stem, laterally extending flexures supporting the stem for movement between longitudinally advanced and retracted positions, and a cross beam which is affixed to the stem and bears against the mounting springs supporting one of the rocker arms.

25. The actuator of claim 24 including an enlarged head toward one end of the stem and a latch engagable with the enlarged head for holding the stem in the advanced position.

26. The actuator of claim 24 including a lock stem movable between laterally advanced and retracted positions relative to the longitudinally extending stem, mating teeth carried by the stems for locking engagement with each other when the stems are in their advanced positions, and resilient means urging the lock stem toward its advanced position.

27. The actuator of claim 18 wherein the preloader comprises a longitudinally extending stem and a bistable spring system supporting the stem for movement to a stable preload position in which forces produced by the bistable spring system balance the forces produced by the mounting spring and the coupling spring.

28. The actuator of claim 27 wherein the bistable spring system comprises a pair of laterally extending leaf springs connected end-to-end in offset planes between the longitudinally extending stem and a support.

29. A bistable latching actuator for use in optical fiber switching applications, comprising: a pair of longitudinally extending rocker arms disposed end-to-end, longitudinally compressible mounting springs supporting the rocker arms for rocking movement relative to a plane, a longitudinally compressible coupling spring interconnecting confronting ends of the rocker arms and constraining the confronting ends for movement in concert between opposite sides of the plane, a mirror carried by one of the rocker arms, a preloader movable between longitudinally advanced and retracted positions relative to the rocker arms for exerting a compressive force upon the springs in the advanced position, and a latch for holding the preloader in the advanced position.

30. A bistable latching actuator for use in optical fiber switching applications, comprising: a substrate, first and second axially elongated rocker arms disposed end-to-end and generally parallel to a major surface of the substrate, a mirror carried by the first rocker arm, axially compressible mounting springs connected between the rocker arms and the substrate, means interconnecting the confronting ends of the rocker arms for movement in concert between stable latching positions on opposite sides of a plane parallel to the surface of the substrate, with the mirror moving in a direction generally perpendicular to the surface, and a preloader for exerting a compressive force on the springs to urge the rocker arms toward the latching positions.

31. The latching actuator of claim 30 wherein the means interconnecting the confronting ends of the rocker arms comprises an axially compressible spring.

32. The latching actuator of claim 30 wherein the mirror is mounted on an outer end portion of the arm.

33. The latching actuator of claim 30 wherein the preloader is movable between an advanced position in which the springs are compressed and a retracted position in which the springs are relaxed, and the preloader can be latched in the advanced position.

* * * * *